July 16, 1929.  F. S. KOCHENDORFER  1,720,681
MOLDED ARTICLE
Filed Dec. 20, 1924
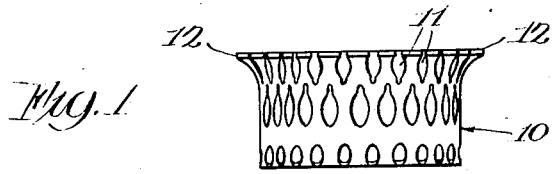
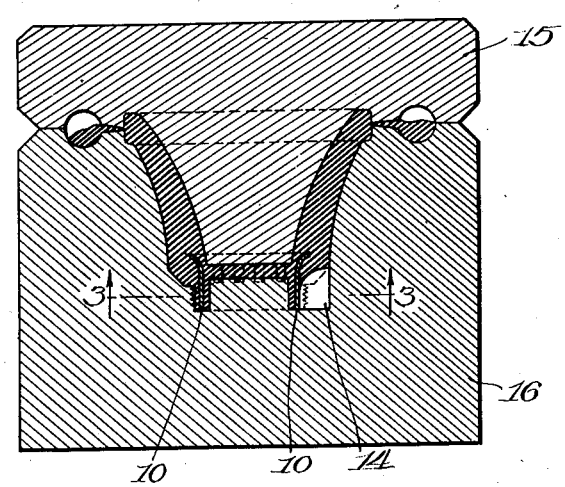
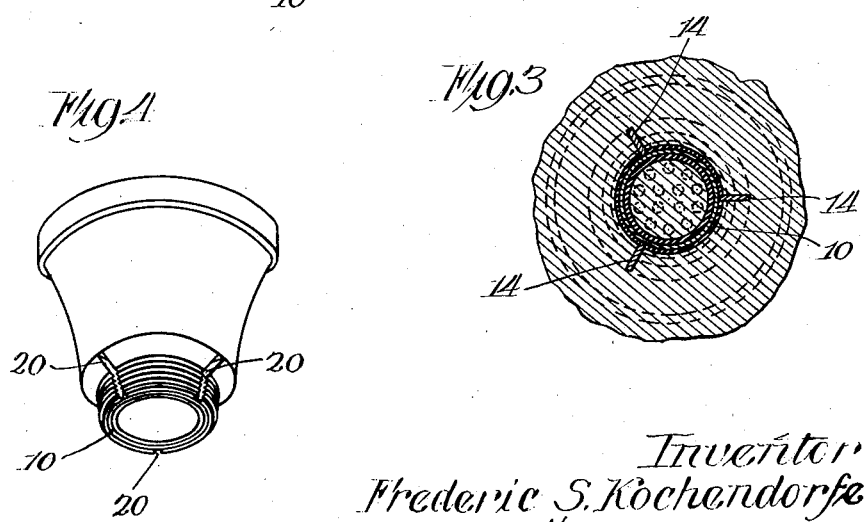
Inventor:
Frederic S. Kochendorfer
By  H. O. Mattison
Atty.

Patented July 16, 1929.

1,720,681

UNITED STATES PATENT OFFICE.

FREDERIC SHIELDS KOCHENDORFER, OF RIVER FOREST, ILLINOIS, ASSIGNOR TO WESTERN ELECTRIC COMPANY, INCORPORATED, OF NEW YORK, N. Y., A CORPORATION OF NEW YORK.

MOLDED ARTICLE.

Application filed December 20, 1924. Serial No. 757,281.

This invention relates to molded articles, and more particularly to a molded telephone transmitter mouthpiece.

The object of the invention is to produce an improved telephone transmitter mouthpiece.

According to the main features of the invention a metallic cylinder having a flared end is engaged at three points on the unflared end thereof and a telephone mouthpiece is molded therearound in a suitable mold with any desirable molding material. The means for engaging the cylinder also act as portions of the die to cause a molding in the threaded portion of the mouthpiece of an equal number of vacuum relieving nicks. The telephone mouthpiece is preferably made of phenolic condensation product and the insert, being of a special form which will be described more in detail hereinafter, does not project beyond the phenolic condensation product.

The invention will be more fully understood from the following description taken with the accompanying drawing, in which Fig. 1 is a metallic insert adapted to be included in a telephone mouthpiece to reinforce the same;

Fig. 2 is a section through a mold showing the manner in which the insert is held during the molding operation and also showing the article in section;

Fig. 3 is a section taken on the line 3—3 of Fig. 2, and

Fig. 4 is a perspective view of the finished article.

Referring now to the accompanying drawing in which like numerals are employed to designate similar members throughout the several views, 10 represents a metallic insert which is preferably made in the manner described in my copending application, Serial No. 757,282, filed December 20, 1924. As illustrated in the drawing, the insert has a plurality of perforations 11 and a flared out portion represented at 12. When the mouthpiece is to be molded, the insert 10 is placed in a mold member 16 and engaged by a plurality of members 14, these members acting to positively and correctly position the insert. The mold member 16 is then filled with a suitable molding compound, preferably a phenolic resin powder, which is capable of being rendered both infusible and insoluble by heat and pressure. An upper mold member 15 is then placed in position and the mold members are then subjected to suitable heat and pressure to render the resin infusible and insoluble. The resin fills the openings 11 and thus securely locks the insert 10 within the mouthpiece. In the mold as shown in the drawing, an overflow chamber is provided to receive whatever molding compound may be present in excess of what is needed to mold the article. When the article has been completely molded it is removed from the mold and any fins or other irregularities are removed, after which it presents an appearance as shown in Fig. 4.

A finished telephone mouthpiece has a plurality of cut-away portions, shown in Fig. 4 and designated by the numeral 20. These cutaway portions are generally termed vacuum relieving nicks and have the effect of maintaining atmospheric air pressure within the telephone transmitter. As is shown in Fig. 3 the engaging members 14, described above, also act as die members to mold the vacuum relieving nicks 20 in the telephone transmitter mouthpiece.

A telephone transmitter mouthpiece, such as that shown in the drawing and made in the manner described above, is strong and light and can be cleaned or disinfected either by means of hot water or strong chemicals without injury thereto. On account of the metal insert not projecting beyond the molding compound there is no possibility of that member being broken away or separated from the main body of molded material. The particular shape of the insert is very desirable. It will be noted that it is parallel to the inside wall of the mouthpiece until it passes beyond the transverse perforated section which is generally designated in the drawing by the numeral 18 and then it flares outwardly at an angle of approximately 45°. An insert of this shape not only adds great strength to the mouthpiece, but also assists in the molding operation. The bead of the unthreaded end of the mouthpiece also adds strength to the mouthpiece and makes it less likely to crack or chip when subjected to rough usage.

What is claimed is:

1. A telephone transmitter mouthpiece made of phenolic condensation product having a beaded edge and containing a metallic insert, no part of which projects beyond the base of the phenolic condensation product.

2. A molded telephone transmitter mouthpiece having a reinforcing insert which consists of alternate perforated and intact areas in which the perforated areas form approximately one-half part of the total area of the insert.

3. A molded telephone transmitter mouthpiece having a flared cylindrical insert provided with perforations over the entire area of the insert.

4. A telephone transmitter mouthpiece comprising a molded body portion, a molded attaching portion integral with the body portion, and a reinforcing insert embedded in the body portion and extending into the attaching portion.

5. A telephone transmitter mouthpiece comprising a molded body portion, a molded attaching portion integral with the body portion and provided with attaching threads, and a perforated insert embedded in the body portion and extending into the attaching portion.

6. A telephone transmitter mouthpiece comprising a molded body member, a molded attaching member integral with the body member, and a flared cylindrical insert having its cylindrical portion in the attaching member and its flared portion in the body member.

7. A molded transmitter mouthpiece having a flared cylindrical insert provided with a plurality of rows of perforations, the perforations in each of the rows being arranged in staggered relationship with respect to the perforations in an adjacent row.

In witness whereof, I hereunto subscribe my name this 11th day of December A. D., 1924.

FREDERIC SHIELDS KOCHENDORFER.